UNITED STATES PATENT OFFICE.

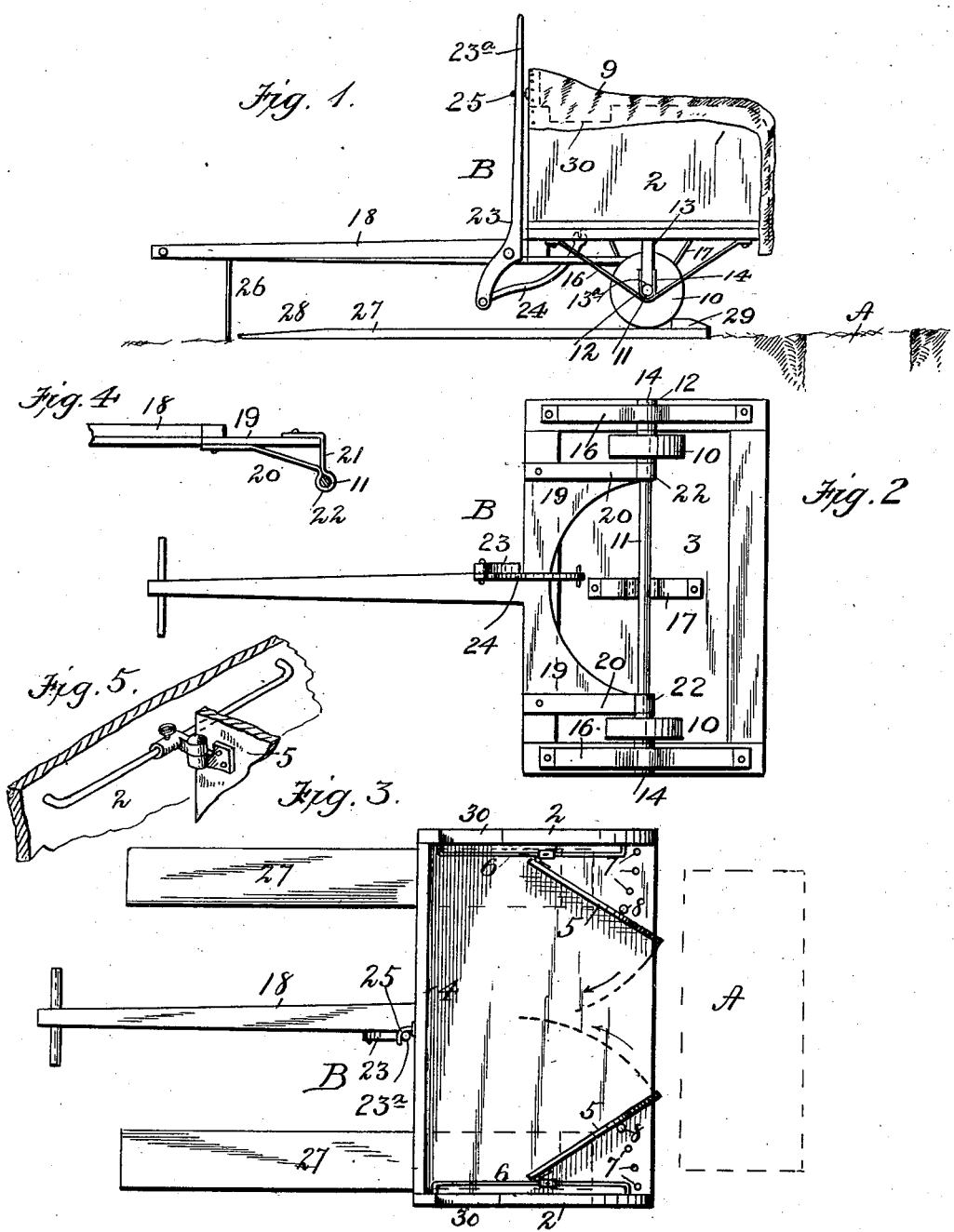

ALEXANDER T. BARNES, OF HENDERSON, NORTH CAROLINA.

GRAVE-DIGGER'S DUMP-CART.

SPECIFICATION forming part of Letters Patent No. 677,921, dated July 9, 1901.

Application filed March 14, 1901. Serial No. 51,071. (No model.)

*To all whom it may concern:*

Be it known that I, ALEXANDER T. BARNES, a citizen of the United States, residing at Henderson, in the county of Vance and State of North Carolina, have invented new and useful Improvements in Grave-Diggers' Dump-Carts, of which the following is a specification.

My invention relates to improvements in dump-carts for holding the dirt excavated from graves and then dumping it back into the grave again.

By means of my invention an improved cart can be constructed which will be particularly suitable for this purpose, in which the dirt will be shielded from view during the burial service, and by means of which it can be dumped into the grave in one mass, all scattering of the dirt avoided, and any surplus can be at once carried away, a track for the cart being also provided, all of which is accomplished by the simple and novel construction described in this specification and illustrated in the accompanying drawings, forming a part thereof, in which—

Figure 1 is a side elevation of my cart. Fig. 2 is a bottom plan of the same. Fig. 3 is a plan view illustrating the relative positions of the track, cart, and pit. Fig. 4 is a detail of one of the brackets and a fragment of one of the hounds. Fig. 5 is a detail of the sliding hinge.

Like characters of reference designate like parts in the different views of the drawings.

The numeral 1 designates the box of my cart, which has sides 2, bottom 3, headboard 4, and which is open at the back. To keep the dirt from falling out by accident and to direct its course when dumped, wings 5 are provided. These wings are about equal in height to the side-boards 2 and are hinged at 6 to the sides 2. To regulate the angle of these wings and retain them at any angle, a series of holes 7 is made in the bottom 3 and a stake or pin 8 provided, which is adapted to fit these holes. By placing one of these pins 8 back of a wing and in one of the holes the wing is held securely in place. When it is desired to have the wings 5 out of the way, they can be swung back against the sides 2 and the pins inserted in the holes 7 in front of them. In order to hide the unsightly pile of earth in the cart from the mourners, a canvas cover 9 is secured to the headboard 4. This cover is of sufficient size to cover the whole box.

The box 1 of my cart is mounted on two wheels 10, which turn on an axle 11, journaled in boxes 12, secured on the ends of standards 13. The boxes 12 are formed by rounding out the ends of the standards 13 at 13ª and placing a cap 14 thereon. Truss members 16 complete the structure, support the caps 14, and strengthen the cart. An intermediate brace 17 supports the axle 11 centrally.

A tongue 18 for my cart is secured to hounds 19, which are pivotally attached to the axle 11 by means of brackets 20. These brackets 20 are integral, have arms 21, and are bent around the axle 11 to form boxes 22. Means for holding the box 1 against accidental dumping and for dumping it when desired are supplied in the shape of a lever 23, fulcrumed intermediate its ends on the tongue 18 and pivotally connected to the lower end of a link 24, which is oppositely pivoted to the bottom 3 of the box 1. A hook 25 is seated in the top portion of the headboard 4 and serves to engage the handle 23ª of the lever and hold it against displacement. A prop 26 is pivoted on the tongue 18 to be used to support the outer end thereof.

A track for my cart to run on in backing it up to a pit consists of two heavy boards or planks 27, each of which is beveled at one end at 28 and has a chock-block 29 rigidly secured to the other end. For convenience in carrying this track the sides 2 of the box 1 are notched in at 30 to accommodate the boards 27, which are just the width of the notches 30.

In operation the track-boards 27 are laid down parallel to each other a distance apart equal to the gage of the cart, beveled ends out and at right angles to the direction of the sides of the proposed grave. (Represented by dotted lines and designated by the letter A in Fig. 3.) The cart B is then backed up on the planks until the wheels come in contact with the chock-blocks 29. The cover 9 is then raised, the wings 5 set, and the excavation commenced. The resulting dirt is shoveled into the cart intermediate the wings. When the grave has been completed, the cover 9 is drawn down and the cart pulled out to the beveled ends 28 of the track. At the conclusion of the ceremony the cart B is again backed up, the handle 23ᵃ of the lever 23 disengaged from the hook 25, the lever thrown down, and the box 1 dumped, all without lifting the cover 9. Should there be an excess of earth over and above that necessary to make the mound, this could be left in the box 1 and carted away and not left scattered over the ground around the grave.

I do not wish to be limited as to details of construction, as these may be modified in many particulars without departing from the spirit of my invention.

Having thus described my invention, what I claim as new, and wish to secure by Letters Patent, is—

1. In a dump-cart, the combination of an axle having traction-wheels thereon, a box pivotally mounted on said axle, a tongue pivotally connected to said axle, a lever fulcrumed on said tongue, a link pivoted at one end to said box and at its other end to said lever, and a hook attached to said box and arranged to engage the handle of said lever, substantially as described.

2. In a cart of the class described, the combination of a box open at the back, of two wings hinged at one end to the sides of the box, and pins fitting holes in the bottom of said box and positioned to hold said wings, substantially as described.

3. In a cart of the class described, the combination with a box open at the back and mounted to dump, of hinged wings adjustably connected to the sides of said box, and means for holding said wings in any position.

In testimony whereof I have hereunto set my hand in presence of two subscribing witnesses.

ALEXANDER T. BARNES.

Witnesses:
K. W. EDWARDS,
W. B. SHAW.